(12) United States Patent
Chong

(10) Patent No.: US 10,017,119 B2
(45) Date of Patent: *Jul. 10, 2018

(54) ADJUSTMENT DEVICE FOR AN AUTOMOTIVE WING MIRROR

(71) Applicant: DONGGUAN HAO YONG AUTOMOTIVE CONTROLS, LIMITED, Guangdong Province (CN)

(72) Inventor: Kyongchol Chong, Guangdong Province (CN)

( * ) Notice: Subject to any disclaimer, the term of this patent is extended or adjusted under 35 U.S.C. 154(b) by 180 days.

This patent is subject to a terminal disclaimer.

(21) Appl. No.: 15/068,654

(22) Filed: Mar. 14, 2016

(65) Prior Publication Data
US 2016/0264055 A1  Sep. 15, 2016

(30) Foreign Application Priority Data
Mar. 13, 2015  (KR) ........................ 10-2015-0034998

(51) Int. Cl.
*B60R 1/072* (2006.01)

(52) U.S. Cl.
CPC ................... *B60R 1/072* (2013.01)

(58) Field of Classification Search
CPC ......... B60R 1/062; B60R 1/066; B60R 1/072; F16H 19/001; F16D 7/022; F16D 41/206
See application file for complete search history.

(56) References Cited

U.S. PATENT DOCUMENTS

| | | | | |
|---|---|---|---|---|
| 4,273,417 A * | 6/1981 | Mittelhauser | ........... | B60R 1/062 359/873 |
| 4,281,899 A * | 8/1981 | Oskam | .................... | B60R 1/072 359/876 |
| 4,670,679 A * | 6/1987 | Koot | ...................... | B60R 1/072 192/20 |
| 5,042,932 A * | 8/1991 | Pent | ........................ | B60R 1/072 359/874 |
| 5,481,931 A * | 1/1996 | Vecchiarino | ............ | B60R 1/072 248/476 |
| 5,701,211 A * | 12/1997 | Perry | ..................... | B60R 1/072 192/20 |
| 6,174,062 B1 * | 1/2001 | Schillegger | ............. | B60R 1/072 248/475.1 |
| 6,341,536 B1 * | 1/2002 | Guttenberger | .......... | B60R 1/072 359/874 |

(Continued)

*Primary Examiner* — Victor L MacArthur
(74) *Attorney, Agent, or Firm* — Prakash Nama; Global IP Services, PLLC

(57) ABSTRACT

An adjustment device for an automotive wing mirror includes an adapter fixed to the wing mirror and having a virtual rotation center and first and second virtual axes perpendicularly intersecting with each other relative to the virtual rotation center, and an adapter driving module to drive the adapter. The adapter driving module includes a bowl-shaped lower shell, an upper shell covering on the lower shell, and two actuator mechanisms. Each actuator mechanism includes a driving motor, a reduction gear set, a clutch assembly meshing with the reduction gear set, and a ring gear meshing with the clutch assembly. The ring gears partially extend through the upper shell and are connected to the adapter on the first virtual axis and the second virtual axis. The adapter is operable of revolving relative to the virtual rotation center in two intersecting directions.

11 Claims, 9 Drawing Sheets

(56) References Cited

U.S. PATENT DOCUMENTS

| | | | | |
|---|---|---|---|---|
| 6,565,221 B2* | 5/2003 | Guttenberger | B60R 1/07 | 359/872 |
| 6,929,374 B2* | 8/2005 | Brouwer | B60R 1/072 | 359/872 |
| 6,971,757 B2* | 12/2005 | Ro | B60R 1/072 | 248/477 |
| 8,127,641 B2* | 3/2012 | Tilg | B60R 1/072 | 359/874 |
| 2004/0105178 A1* | 6/2004 | Brouwer | B60R 1/072 | 359/872 |
| 2005/0099710 A1* | 5/2005 | Ro | B60R 1/072 | 359/872 |
| 2007/0290117 A1* | 12/2007 | Hetrick | B60R 1/072 | 248/495 |
| 2011/0194203 A1* | 8/2011 | Foote | B60R 1/062 | 359/876 |
| 2012/0275044 A1* | 11/2012 | Caballero Tapia | B60R 1/072 | 359/872 |
| 2015/0160431 A1* | 6/2015 | van Stiphout | B60R 1/066 | 248/487 |

* cited by examiner

ADJUSTMENT DEVICE FOR AN AUTOMOTIVE WING MIRROR

BACKGROUND OF THE INVENTION

The present invention relates to automobiles, and more particularly to an adjustment device for a wing mirror of an automobile.

Currently, to enable a driver to easily observe traffic situation around a rear side of an automobile, wing mirrors are mounted to both sides of the automobile and in front of front doors of the automobile. A wing mirror assembly includes a housing, a wing mirror located at a side of the housing and angularly adjustable, and an adjustment device mounted in the housing to adjust an angle of the wing mirror. The adjustment device generally includes a power-actuator unit driven by a power source to adjust the angle of the wing mirror, and a manual-actuator unit to manually adjust the angle of the wing mirror.

A Korean patent with register No. 10-0539070, which is named "Mechanism for Adjusting an Automotive Wing Mirror Assembly", applied in Dec. 16, 2003, and registered in Dec. 20, 2005, is disclosed. The mechanism includes a lower base fixed to a predetermined position of a housing, an upper base mounted to an upper portion of the lower base, a driving unit located between the upper base and the lower base, an adapter formed with a partial ball-type center portion, a pivot link formed between each center portion of the upper case and the adapter to control the adapter to rotate about first and second rotation shafts formed on a surface of the adapter to be mutually crossed, a pivot cup having a hemisphere unit placed at the center portion of the adapter, a spring retainer rotated and combined with a combining projection of the pivot cup, a spring compressed and mounted between the lower base and the spring retainer as the pivot cup and the spring retainer are rotated and combined, and a mirror position detecting unit mounted at one upper surface of the lower base.

However, the pivot structure of the above-mentioned technique includes several complex components to become complicated, and it is difficult to obtain a compact and slim automotive wing mirror assembly because of the complicated pivot structure. Furthermore, in the prior art, because traveling vibration transmitted from the outer side to the adapter is collected in and absorbed by the central region of the adapter, vibration absorption is weak in the peripheral zone of the adapter. Thus, the peripheral region of the adapter relatively shakes more, and the shake of the adapter will be transmitted to the wing mirror, which will obstruct the driver's field of vision severely.

Prior art document: patent document, Korean Patent No. 10-0623330 (application date: Dec. 16, 2003).

BRIEF SUMMARY OF THE INVENTION

Therefore, an object of an adjustment device for an automotive wing mirror is provided, the adjustment device can precisely and reliably adjust an angle of the wing mirror, and can obtain a compact and lightweight structure including the wing mirror.

Another object of the adjustment device for the automotive wing mirror is provided, the adjustment device can effectively absorb vibration of the vehicle in a wider range to minimize the vibration transmitted to the wing mirror.

According to the present invention, an adjustment device for an automotive wing mirror includes an adapter fixed to the wing mirror, and an adapter driving module to drive the adapter to adjust the wing mirror. The adapter has a virtual rotation center, and first and second virtual axes perpendicularly intersecting with each other relative to the virtual rotation center. The adapter driving module includes a bowl-shaped lower shell, an upper shell covering on the lower shell and defining two connection holes, and two actuator mechanisms located between the upper shell and the lower shell. Each actuator mechanism includes a driving motor, a reduction gear set to reduce a shaft rotation speed of the driving motor and output a reduced rotation speed from a direction different from the shaft rotation speed, a clutch assembly meshing with the reduction gear set, and a ring gear meshing with the clutch assembly. The ring gears of the actuator mechanisms partially extend through the connection holes of the upper shell and are connected to the adapter respectively on the first virtual axis and the second virtual axis, the adapter is operable of revolving relative to the virtual rotation center, and is operable of revolving in two intersecting directions.

According to an embodiment, the adjustment device further includes a vibration absorber; the vibration absorber is partially combined to the adapter driving module to absorb vibration; the vibration absorber includes an annular body, and a plurality of elastic tabs extending from the annular body and elastically abutted against an outer curved surface of the lower shell.

According to an embodiment, the adjustment device further comprises a pivot, a center of the upper shell defines an opening, an upper portion of the opening is bounded by a rotation guide surface; the adapter defines a pivot insertion hole aligning with the opening, and includes a pivot jointing portion limiting the pivot insertion hole inward and slowly extending down to form a curved surface and having an annular cross-section, the pivot extends through the pivot insertion hole and the opening to be engaged with the upper shell, the pivot jointing portion is located between an outer surface of the pivot and the rotation guide surface, the adapter is operable of revolving relative to the upper shell about the virtual rotation center on the pivot.

According to an embodiment, the upper shell forms an engaging portion at a lower portion of the opening, the pivot includes an elastic hook passing through the pivot insertion hole and the opening to hook the engaging portion, the hook defines a plurality of notches allowing an end surface of the hook to be elastically contract and expand to be restored, the hook is operable of contracting before hooking the engaging portion, and expanding to be restored in response to hooking the engaging portion.

According to an embodiment, the adapter defines a pair of first guiding holes symmetrically arranged on the first virtual axis about the virtual rotation center, and a pair of second guiding holes symmetrically arranged on the second virtual axis about the virtual rotation center; the upper shell includes a pair of first guiding portions engaged in the pair of first guiding holes, and a pair of second guiding portions engaged in the pair of second guiding holes, allowing the adapter to revolve only in a fore-and-aft direction and a left-and-right direction.

According to an embodiment, the actuator mechanisms are axisymetrically arranged relative to a virtual center line extending through the virtual rotation center, and the ring gears of the actuator mechanisms are arranged in a 90-degree angle.

According to an embodiment, the reduction gear set includes a first worm formed on an output shaft of the driving motor, a worm gear meshing with the first worm, and a second worm coaxial with the worm gear; the clutch assembly includes a clutch gear meshing with the second worm, a pinion gear, and left-handed and right-handed clutch springs; the clutch gear accepts a rotation force from the reduction gear set to drive the ring gear in response to the driving motor operating to adjust the angle of the wing mirror, and disconnects a force connection between the reduction gear set and the ring gear in response to manually adjusting the angle of the wing mirror; the clutch gear defines a groove in an inner circumference of the clutch gear; the pinion gear includes a gear portion meshing with the ring gear and a clutch holding surface integrally formed with the gear portion; the left-handed and right-handed clutch springs are fitted about the clutch holding surface and coiled on the clutch holding surface in two opposite directions, a protrusion extends from each of the left-handed and right-handed clutch springs and engages in the groove.

According to an embodiment, the clutch assembly includes a clutch gear meshing with an extremity of the reduction gear set, a pinion gear, and left-handed and right-handed clutch springs; the clutch gear defines a groove in an inner circumference of the clutch gear, the pinion gear includes a gear portion meshing with the ring gear and a clutch holding surface integrally formed with the gear portion, the left-handed and right-handed clutch springs are fitted about the clutch holding surface and coiled on the clutch holding surface in two opposite directions, a protrusion extends from each of the left-handed and right-handed clutch springs and engages in the groove.

According to an embodiment, the pinion gear defines an annular guiding slot between the gear portion and the clutch holding surface, the clutch holding surface and a portion of the pinion gear defining the guiding slot are located in an inner side of the clutch gear bounded by the inner circumference, a projection extends from the inner circumference of the pinion gear, and is slidably engaged in the guiding slot to allow the pinion gear to rotate relative to the clutch gear, the left-handed and right-handed clutch springs are located between the clutching holding surface and the inner circumference of the clutch gear.

According to an embodiment, an end of the pinion gear at the clutch holding surface is stepped to form a blocking portion, to prevent the left-handed and right-handed springs from disengaging from the pinion gear.

According to an embodiment, the lower shell forms two arc-shaped guiding parts arranged in a 90-degree angle, the ring gears are operable of revolving relative to the virtual rotation center along the guiding parts.

According to an embodiment, each of the ring gear includes a linking portion on a top end of the ring gear, the linking portion defines a pin hole, the linking portion extends out of the upper shell through the connection hole, and a pin extends through the pin hole and is engaged in the adapter.

The pivot connection structure of the present invention more firmly supports the shell and the adapter, and the vibration absorber can effectively absorb vibration by arranging the elastic tabs in a circle and to be elastically abutted against the lower shell. Furthermore, the effect of the present invention is to firmly support the shell and the adapter through the pivot with a rotation center.

Other objects, advantages, and novel features of the invention will become more apparent from the following detailed description when taken in conjunction with the accompanying drawings.

DETAILED DESCRIPTION OF THE INVENTION

Figure 1:
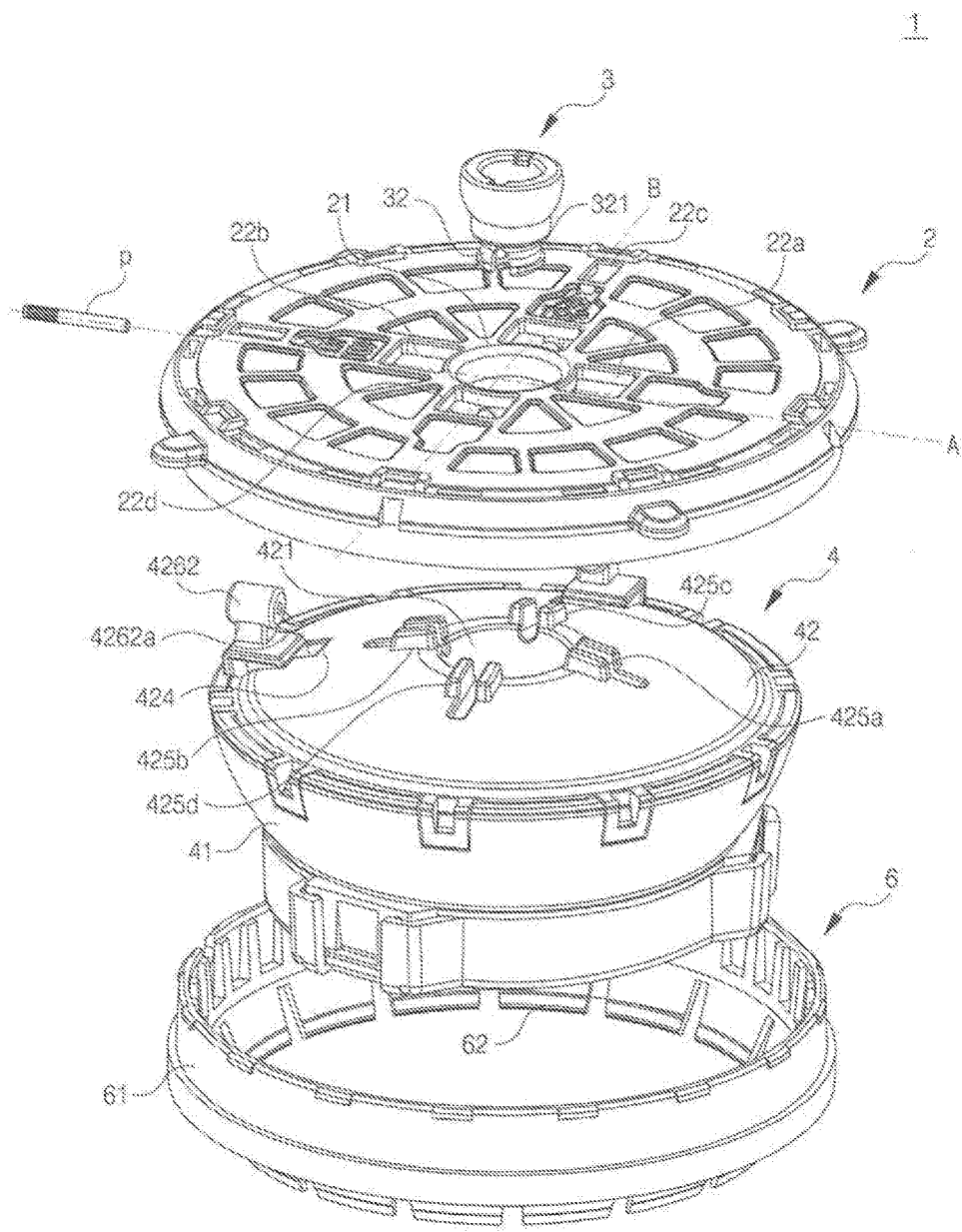
FIG. 1 is an exploded, isometric view of an adjustment device for an automotive wing mirror of an embodiment of the present invention, wherein the adjustment device includes an adapter, an upper shell, and an actuator mechanism.

It should be noted that, without conflict, examples of the present application and the features of the examples can be combined with each other, the present invention will be described in further detail accompanying with the drawings and the following embodiments.

The following examples are described as skilled in the art to be able to fully convey the concept of the present invention. Thus, the present invention is not limited to the embodiments described below, and can be specific in other forms. Furthermore, for convenience, the drawings can be exaggerated to show constituent width, length, thickness, etc.

Referring to FIGS. 1 to 5, an embodiment of an adjustment device 1 for an automotive wing mirror is located inside a housing (not shown) of a wing mirror assembly, to adjust a position of the wing mirror. The adjustment device 1 includes an adapter 2 tightly fixed to the wing mirror, an adapter driving module 4 for driving the adapter 2 to adjust the wing mirror, and a vibration absorber 6 to absorb vibration and prevent the vibration from being transmitted to the wing mirror through the adapter driving module 4 and the adapter 2. In an automotive wing mirror assembly, a housing of the wing mirror assembly defines an opening in a front side, and the wing mirror is rotatably mounted to the housing at the opening. The adjustment device 1 is located in the housing and behind the wing mirror, and can adjust an angle of the wing mirror along two directions.

The adapter driving module 4 includes a substantially bowl-shaped lower shell 41 fixed in the housing, an upper shell 42 covered on the lower shell 41 and defining two connection holes 424, and two actuator mechanisms 43 located between the lower shell 41 and the upper shell 42 and partially extending through the connection holes 424 defined in the upper shell 42 to connect the adapter 2.

A center of the upper shell 42 has a substantially hemispherical surface, and the center of the upper shell 42 defines an opening 421 wider at the top of the opening 421. The upper shell 42 forms a lower end surface (not labeled) at a lower portion of the opening 421 and an engaging portion 422 intersecting with the lower end surface.

A portion of the upper shell 42 bounding an upper portion of the opening 421 and located above the engaging portion 422 is a substantially hemispherical surface, which is a rotation guide surface 423. Furthermore, the adapter 2 defines a pivot insertion hole 21 aligning with the opening 421. The adapter 2 includes a pivot jointing portion 22 limiting the pivot insertion hole 21 inward and slowly extending down to form a curved surface and having an annular cross-section. A pivot 3 extends through the pivot insertion hole 21 of the adapter 2 and the opening 421 of the upper shell 42 to be hooked to a bottom of the engaging portion 422 below the opening 421. In order to achieve the above said pivot hooked structure, a bottom end of the pivot 3 integrally forms an elastic hook 32, and the hook 32 defining a plurality of notches 321. The notches 321 allow an end surface of the hook 32 to contract or allow the end surface of the hook 32 to expand and to be restored. The end surface of the hook 32 contracts when the hook 32 extends through the opening 421, and the end surface of the hook 32 expands to be restored after the hook 32 passes through the opening 421, thereby hooking the engaging portion 422. Therefore, the pivot 3 is mounted to the opening 421 of the upper shell 42 through the above said pivot hooked structure. A gap (not labeled) is defined between the rotation guide surface 423 and an outer surface of the pivot 3. The pivot jointing portion 22 of the adapter 2 is rotatably engaged in the gap, thereby allowing the adapter 2 to revolve relative to the pivot 3 in a fore-and-aft direction and in a left-and-right direction to adjust the angle of the wing mirror. Connecting structure including the above-mentioned pivot 3 as rotation structure can be configured by simple structure, and can reliably connect the center of the adapter 2 and the center of the upper shell 42, thereby allowing the adapter 2 to reliably float about a virtual rotation center located on the pivot 3. Furthermore, the hooking connecting structure of the hook 3 can firmly be maintained, and the hook 3 will not disengage from the upper shell 42 due to vibration and shock.

In accordance with the embodiment of the adjustment device 1 including a guiding structure allowing the adapter 2 to revolve only along the fore-and-aft and left-and-right directions relative to the upper shell 42, the guide structure is detailed described below. The adapter 2 has a first virtual axis A and a second virtual axis B perpendicularly intersecting with each other in the same virtual plane with respect to the virtual rotation center. The adapter 2 defines a pair of guiding holes 22a and 22b symmetrically located on the first virtual axis A in reference to the virtual rotation center, and a pair of guiding holes 22c and 22d symmetrically located on the second virtual axis B in reference to the virtual rotation center. The upper shell 42 includes a pair of guiding portions 425a and 425b corresponding to the guiding holes 22a and 22b, and a pair of guiding portions 425c and 425d corresponding to the guiding holes 22c and 22d. The two pairs of guiding portions 425a, 425b, 425c, and 425d (collectively referred to as 425) are engaged in the corresponding pairs of guiding holes 22a, 22b, 22c, and 22d in a 90-degree angle, to perform the guiding function of limiting the adapter 2 to revolve only along the fore-and-aft and left-and-right directions.

Moreover, an edge of the upper shell 42 defines the two connection holes 424 separate in a 90-degree angle, allowing distal ends of the two actuator mechanisms 43 located in the lower shell 41 to partially extend through to be connected to the adapter 2. The actuator mechanisms 43 are directly located below the first virtual axis A and the second virtual axis B side by side.

Figure 5:
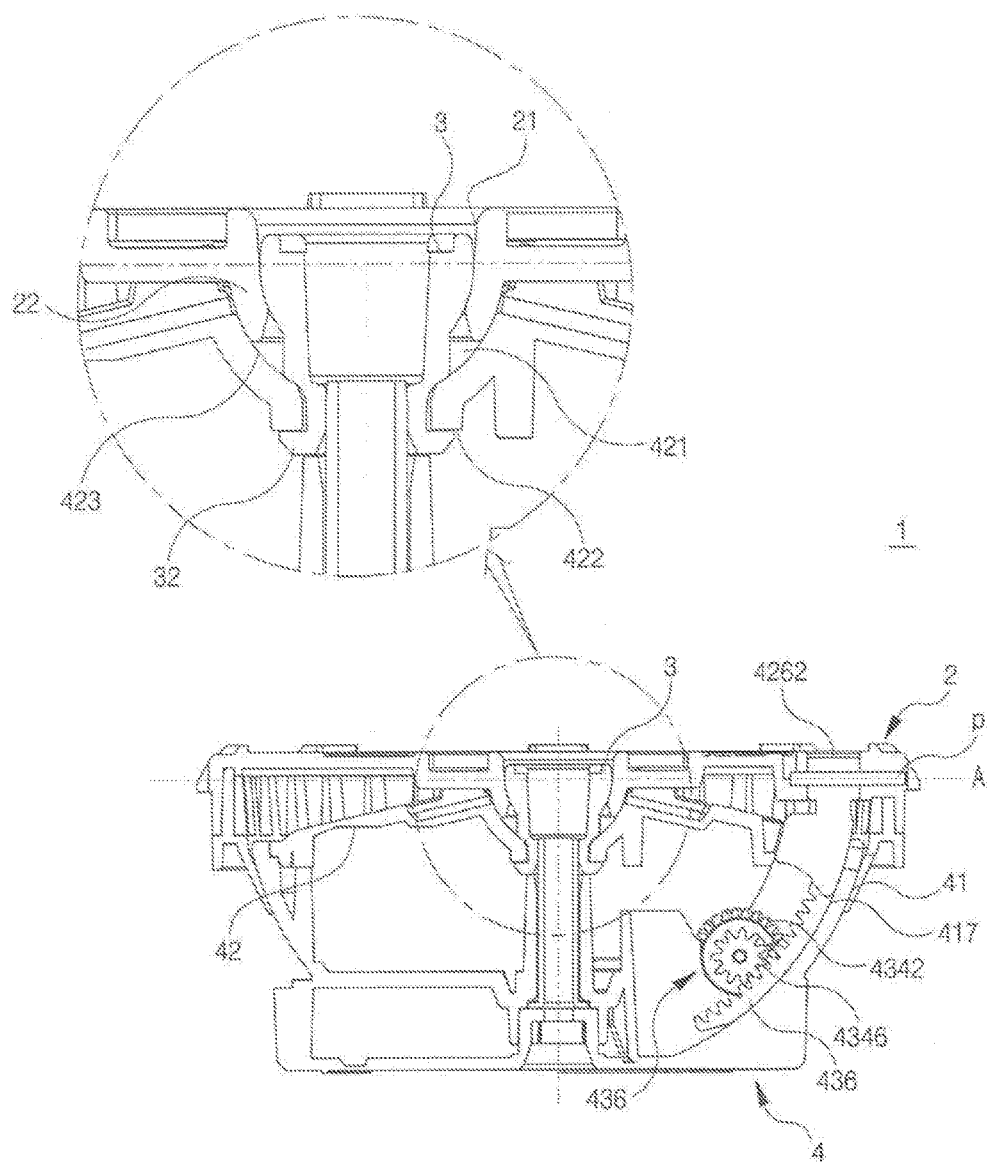
FIG. 5 is a cross-sectional view of FIG. 3.
Figure 6:
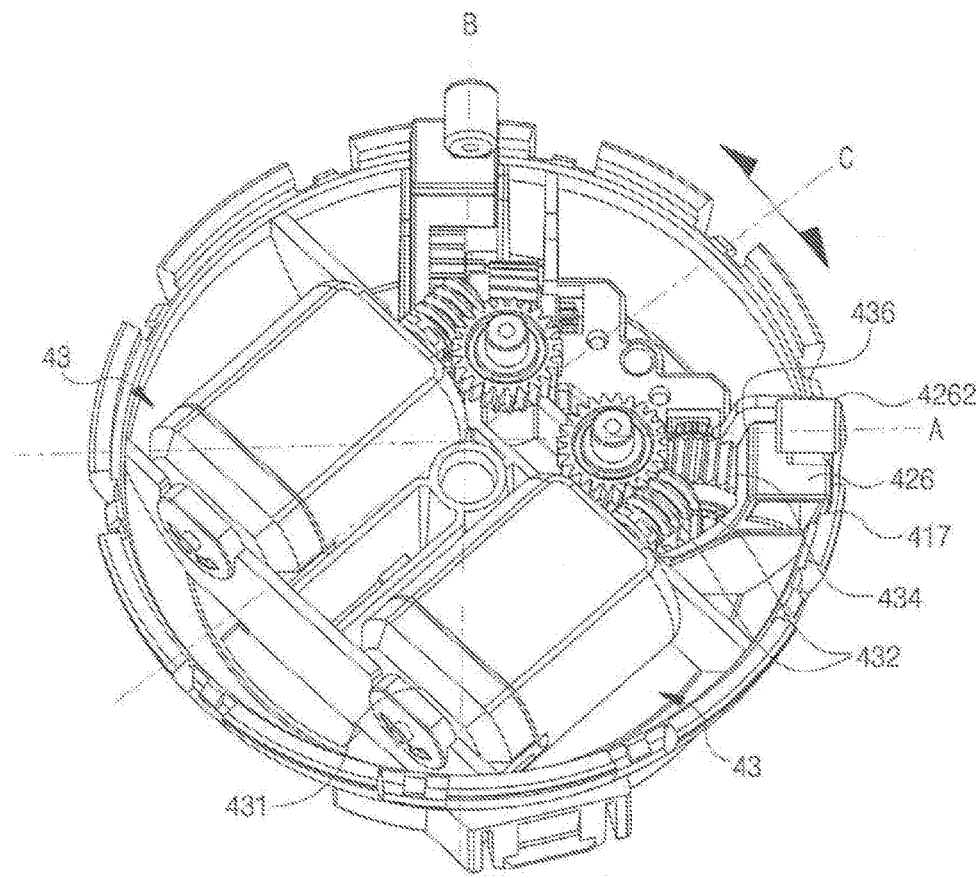
FIG. 6 is similar to FIG. 3, but omitting the adapter and the upper shell.
Figure 7:
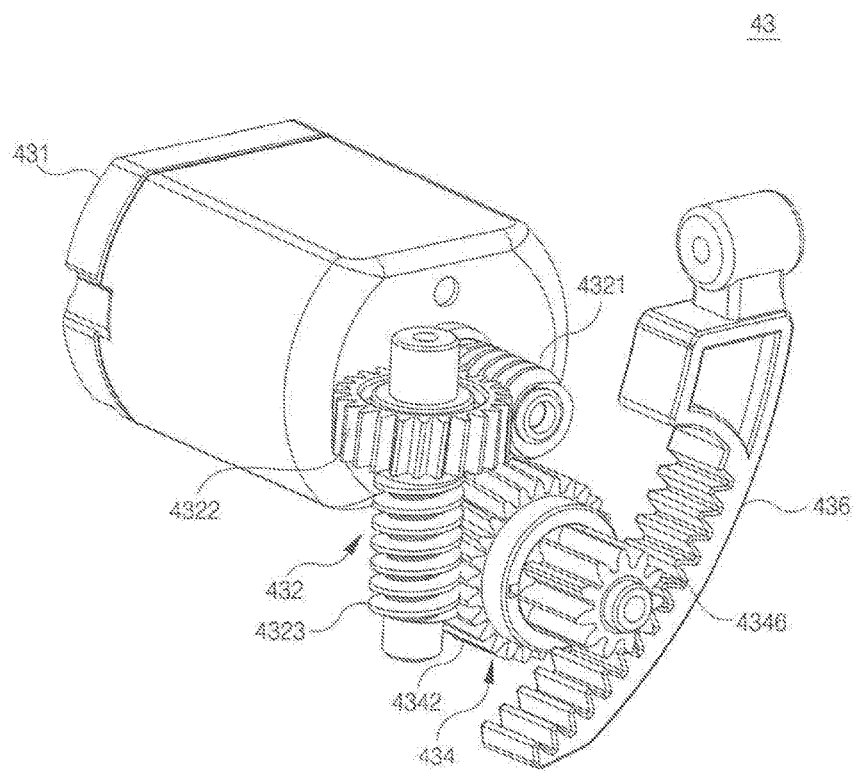
FIG. 7 is an assembled, isometric view of the actuator mechanism of FIG. 1, wherein the actuator mechanism includes a clutch assembly.

Referring to FIGS. 5 to 7, the actuator mechanisms 43 are located between the lower shell 41 and the upper shell 42, and are axisymmetrical with respect to a virtual center line C extending through the virtual rotation center. The actuator mechanisms 43 partially extend through the connection holes 424 of the upper shell 42 to be connected to the adapter 2, allowing the adapter 2 to revolve along the fore-and-aft and left-and-right directions.

Each of the actuator mechanisms 43 includes a driving motor 431, a reduction gear set 432 for decelerating an axis rotation of the driving motor 431 and outputting a decelerated rotation in another direction different from the axis rotation, a clutch assembly 434 meshing with the reduction gear set 432, and a ring gear 436 meshing with the clutch assembly 434. The ring gear 436 is connected to the adapter 2.

The reduction gear set 432 not only can decelerate the axis rotation of the driving motor 431 but also can change the rotation direction from about a horizontal direction parallel to the virtual center line C to about a vertical direction. In the embodiment, the reduction gear set 432 includes a first worm 4321 formed on an output shaft of the driving motor 431, a worm gear 4322 meshing with the first worm 4321, and a second worm 4323 integrally and coaxially formed with the worm gear 4322.

Furthermore, the clutch assembly 434 is connected between the reduction gear set 432 and the ring gear 436. The working principle of the clutch assembly 434 is that when the driving motor 431 operates to adjust the angle of the wing mirror, the driving motor 431 drives the reduction gear set 432 to rotate, thereby driving the ring gear 436 to rotate through the clutch assembly 434 and driving the adapter 2 connected to the ring gear 436 to revolve, while when manually adjusting the angle of the wing mirror, the force connection between the reduction gear set 432 and the ring gear 436 is disconnected, thereby allowing manual adjustment and protecting the driving motor 431.

Figure 8:
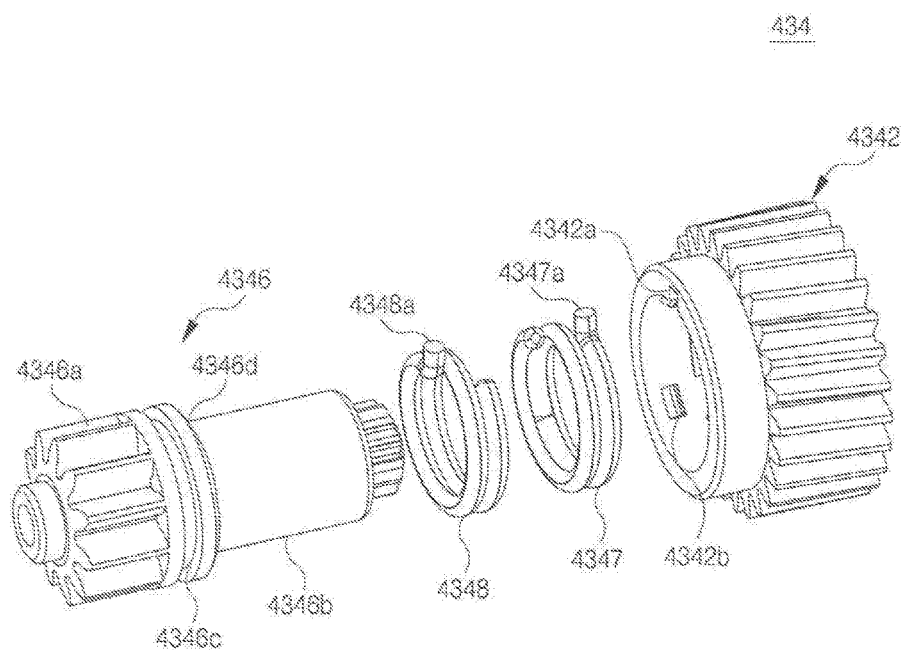
FIG. 8 is an exploded, isometric view of the clutch assembly of FIG. 7.
Figure 9:
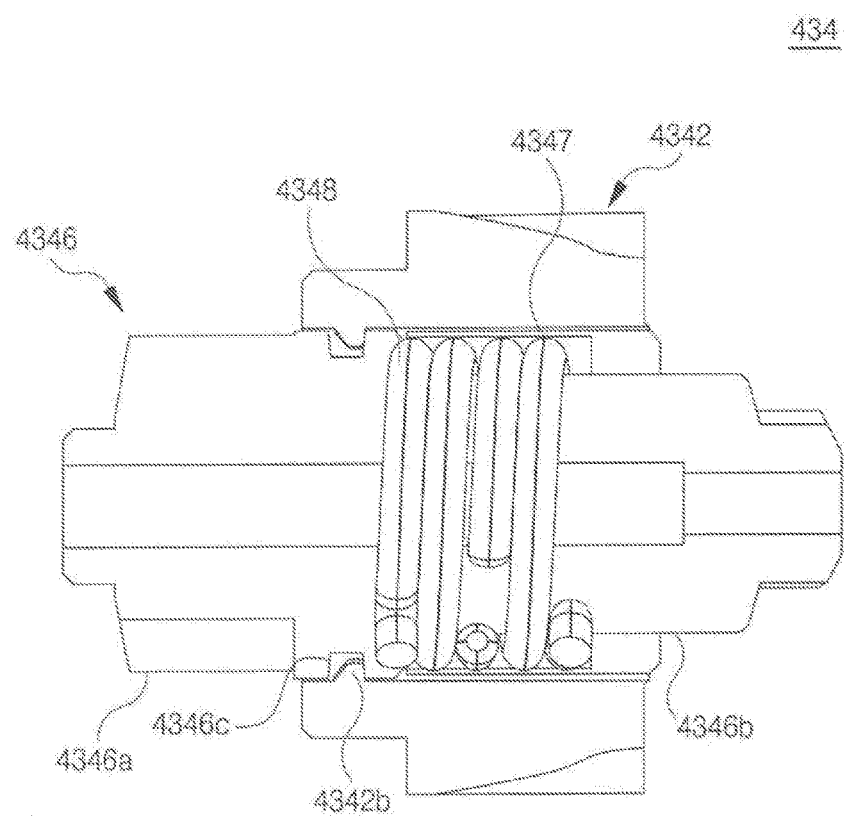
FIG. 9 is a cross-sectional view of the clutch assembly of FIG. 7.

Referring to FIGS. 8 and 9, the clutch assembly 434 includes a clutch gear 4342, a pinion gear 4346, a left-handed clutch spring 4347, and a right-handed clutch spring 4348. The clutch gear 4342 is cylindrical, and has an outer circumference where a teeth portion is formed to mesh with the second worm 4323 of the reduction gear set 432, and an inner circumference defining a groove 4342a extending along a direction parallel to an axis of the clutch gear 4342. The pinion gear 4346 includes a gear portion 4346a meshing with the ring gear 436, and a clutch holding surface 4346b integrally formed with the gear portion 4346a. The left-handed clutch spring 4347 and the right-handed clutch spring 4348 are fitted about the clutch holding surface 4346b and coiled on the clutch holding surface 4346b in two opposite directions. The left-handed clutch spring 4347 includes a protrusion 4347a extending from an end of the left-handed clutch spring 4347. The right-handed clutch spring 4348 includes a protrusion 4348a extending from an end of the right-handed clutch spring 4348. The protrusions 4347a and 4348a are engaged in the groove 4342a.

A circumference of the pinion gear 4346 defines an annular guiding slot 4346c between the gear portion 4346a and the clutch holding surface 4346b. More specifically, a cylindrical portion of the pinion gear 4346 forming the clutch holding surface 4346b and the guiding slot 4346c are located in an inner side of the clutch gear 4342 bounded by the inner circumference of the clutch gear 4342. A projection 4342b extends from the inner circumference of the clutch gear 4342. The projection 4342b is slidably engaged in the guiding slot 4346c of the pinion gear 4346, thus, the pinion gear 4346 is rotatably mounted to the clutch gear 4342. The left-handed clutch spring 4347 and the right-handed clutch spring 4348 form a pair of clutch springs, are located between the inner circumference of the clutch gear 4342 and the clutch holding surface 4346b of the pinion gear 4346, and are fitted about the clutch holding surface 4346*b* and coiled on the clutch holding surface 4346*b* in the opposite directions. An end of the pinion gear 4346 at the clutch holding surface 4346*b* has a stepped structure to form a blocking portion 4346*d* on an end surface of the clutch holding surface 4346*b*. The blocking portion 4346*d* can prevent a spring set including the left-handed clutch spring 4347 and the right-handed clutch spring 4348 from being disengaged from the pinion gear 4346, and restrict the clutch springs 4347 and 4348 to unwind above a certain length to increase the length of the clutch springs 4347 and 4348.

When the clutch springs 4347 and 4348 are restricted by the blocking portion 4346*d*, the protrusions 4347*a* and 4347*b* of the clutch springs 4347 and 4348 are engaged in the groove 4342*a* of the clutch gear 4342. Therefore, the clutch springs 4347 and 4348 are rotated together with the clutch gear 4342 to carry out the force function of connecting the clutch gear 4342 and the pinion gear 4346.

The clutch springs 4347 and 4348 coiled in two opposite directions can more finely adjust a clutch force accompanying with the rotation of the clutch assembly 434. That is, when the clutch assembly 434 rotates to the left, the left-handed clutch spring 4347 is in the winding status and strongly holds the clutch holding surface 4346*b*, thereby increasing the clutch force; and on the other hand, the right-handed clutch spring 4348 is in the unwinding status and rotates with a small force, thereby maintaining force balance of each other. Conversely, when the clutch assembly 434 rotates to the right, the right-handed clutch spring 4348 is in the winding status and strongly holds the clutch holding surface 4346*b*, thereby increasing the clutch force; and on the other hand, the left-handed clutch spring 4347 is in the unwinding status and rotates with a small force, thereby maintaining force balance of each other.

The clutch force can be limited through adjusting amounts of change of inside diameters, wire diameters, and numbers of windings of the clutch springs 4347 and 4348 assembled to the pinion gear 4346. Therefore, the clutch springs 4347 and 4348 become a sliding motion structure under a certain force greater than the fixing force, and the clutch springs 4347 and 4348 become a force connection connected between the pinion gear 4346 and the clutch gear 4342 through the holding force applied on the clutch holding surface 4346*b* by the clutch springs 4347 and 4348. Therefore, when the clutch gear 4342 meshes and rotates with the second worm 4323 connected to the output shaft of the driving motor 431, the pinion gear 4346 rotates together, thereby allowing the ring gear 436 (shown in FIG. 7) meshed with the pinion gear 4345 to revolve relative to the virtual rotation center on the pivot 3 (shown in FIGS. 1-7).

Referring to FIGS. 1-7, the ring gears 436 of the actuator mechanisms 43 revolve relative to the virtual rotation center on the pivot 3, and revolve up and down along two arc-shaped guiding parts 417 formed on the lower shell 41 and arranged in a 90-degree angle. Each of the ring gears 436 integrally forms a cylindrical linking portion 4262 on a top end of the ring gear 436. The linking portion 4262 defines a pin hole 4262*a*. The linking portions 4262 of the ring gear 436 extend out of the upper shell 42 through the corresponding connection holes 424, and then are connected to the adapter 2 through pins P extending through the pin holes 4262*a* and engaging in the adapter 2.

Positions of the ring gears 436 extending through the upper shell 42 to be connected to the adapter 2 are respectively located on the first virtual axis A and the second virtual axis B. When one of the axisymmetrically arranged actuator mechanisms 43 drives one of the ring gears 436 arranged in the 90-degree angle to revolve up and down relative to the pivot 3 along an arc-shaped path, the corresponding ring gear 436 on the first virtual axis A or the second virtual axis B drives the adapter 2 to revolve relative to the virtual rotation center on the pivot 3 in a fore-and-aft direction or in a left-and-right direction. Therefore, the angle of the adapter 2 is adjusted, causing the wing mirror fixed to the adapter 2 to be adjusted. Furthermore, as the above-mentioned as, the adapter 2 is limited to revolve in the fore-and-aft and left-and-right directions through the guiding portions 425*a*, 425*b*, 425*c*, and 425*d* being engaged in the corresponding guiding holes 22*a*, 22*b*, 22*c*, and 22*d* respectively located on the first virtual axis A and the second virtual axis B.

Figure 2:
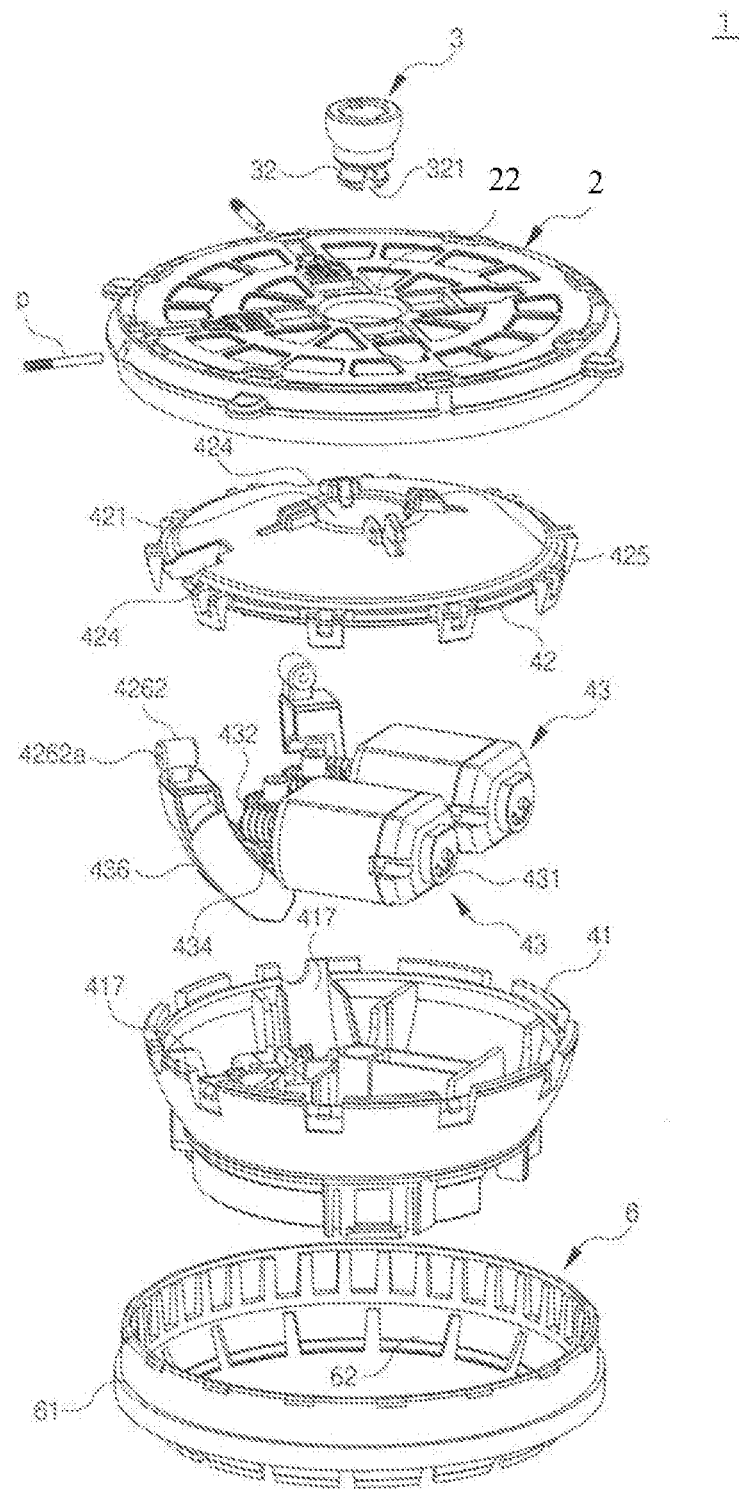
FIG. 2 is another exploded, isometric view of the adjustment device of FIG. 1.
Figure 3:
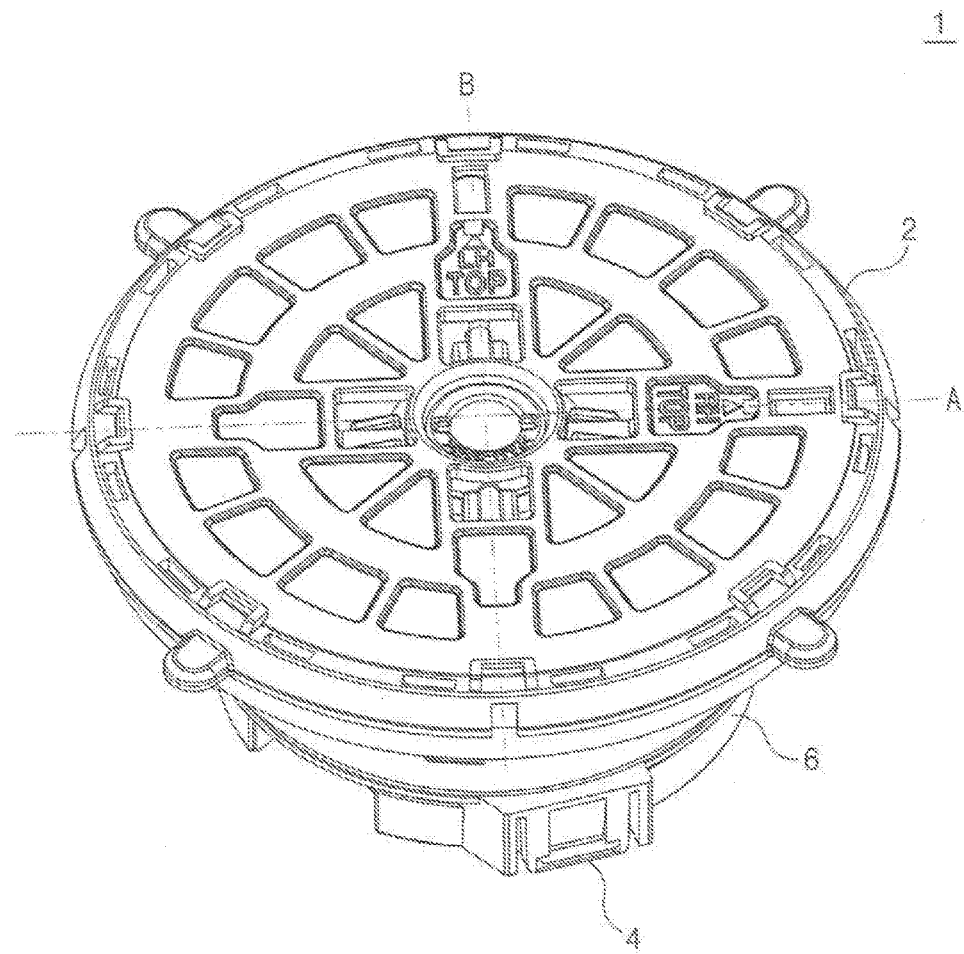
FIG. 3 is an assembled, isometric view of FIG. 1.
Figure 4:
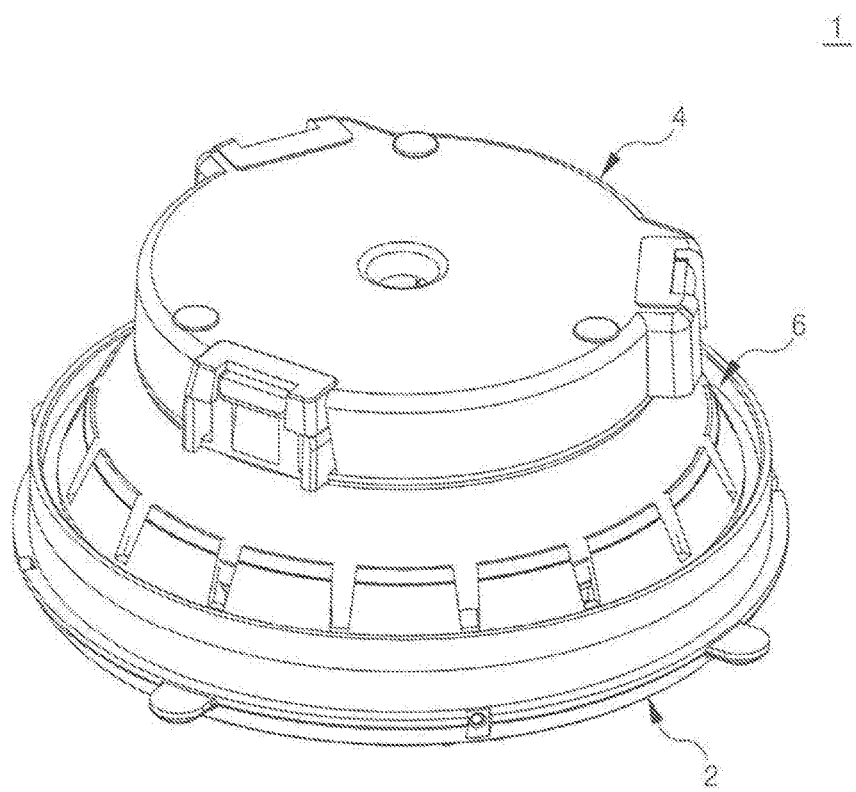
FIG. 4 is an inverted view of FIG. 3.

Referring to FIGS. 1, 2, and 4, on the other hand, the vibration absorber 6 is arranged on a side of the adapter driving module 4 to absorb vibration, and then to prevent the vibration from being transmitted to the adapter 2 and the wing mirror fixed to the adapter 2. The vibration absorber 6 is substantially annular, and includes a rigid annular body 61 and a plurality of elastic tabs 62 extending down from a bottom of the annular body 61 and arranged in a circle. The elastic tabs 62 are elastically abutted against an outer surface of the adapter driving module 4. More specifically, the elastic tabs 62 elastically hold a lower curved surface of the outer surface of the adapter driving module 4. Even if the vibration is transmitted to the adapter driving module 4, because the elastic tabs 62 absorb the vibration, vibration transmitted to the wing mirror is reduced. Therefore, the vibration absorber 6 can effectively reduce vibration.

Centers of the arc-shaped guiding parts 417 of the lower shell 41 and centers of the ring gears 436 are consistent with the virtual rotation center on the pivot 3. Although not illustrated, below the lower shell 41, there is a contact portion connected to an electrode connected to an electrode of a driving motor and a power supply pattern connected to a terminal of an external power supply.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. An adjustment device for an automotive wing mirror, comprising:
    an adapter fixed to the wing mirror, the adapter having a virtual rotation center, and first and second virtual axes perpendicularly intersecting with each other relative to the virtual rotation center; and
    an adapter driving module to drive the adapter to adjust the wing mirror, the adapter driving module comprising:
    a bowl-shaped lower shell;
    an upper shell covering on the lower shell and defining two connection holes; and
    two actuator mechanisms located between the upper shell and the lower shell, wherein each actuator mechanism comprises a driving motor, a reduction gear set to reduce a shaft rotation speed of the driving motor and output a reduced rotation speed from a direction different from the shaft rotation speed, a clutch assembly meshing with the reduction gear set, and a ring gear meshing with the clutch assembly;
    wherein the ring gears of the actuator mechanisms partially extend through the connection holes of the upper shell and are connected to the adapter respectively on the first virtual axis and the second virtual axis, the adapter is operable of revolving relative to the virtual rotation center in two intersecting directions;

the reduction gear set comprises a first worm formed on an output shaft of the driving motor, a worm gear meshing with the first worm, and a second worm coaxial with the worm gear; the clutch assembly comprises a clutch gear meshing with the second worm, a pinion gear, and left-handed and right-handed clutch springs, wherein the clutch gear accepts a rotation force from the reduction pear set to drive the ring gear in response to the driving motor operating to adjust the angle of the wing mirror, and disconnects a force connection between the reduction gear set and the ring gear in response to manually adjusting the angle of the wing mirror: the clutch gear defines a groove in an inner circumference of the clutch gear; the pinion gear comprises a gear portion meshing with the ring gear and a clutch holding surface integrally formed with the gear portion; the left-handed and right-handed clutch springs are fitted about the clutch holding surface and coiled on the clutch holding surface in two opposite directions, a protrusion extends from each of the left-handed and right-handed clutch springs and engages in the groove.

2. The adjustment device of claim 1, further comprising a vibration absorber, wherein the vibration absorber is partially combined to the adapter driving module to absorb vibration, the vibration absorber comprises an annular body, and a plurality of elastic tabs extending from the annular body and elastically abutted against an outer curved surface of the lower shell.

3. The adjustment device of claim 1, further comprising a pivot, wherein a center of the upper shell defines an opening, an upper portion of the opening is bounded by a rotation guide surface; the adapter defines a pivot insertion hole aligning with the opening, and comprises a pivot jointing portion limiting the pivot insertion hole inward and slowly extending down to form a curved surface and having an annular cross-section, the pivot extends through the pivot insertion hole and the opening to be engaged with the upper shell, the pivot jointing portion is located between an outer surface of the pivot and the rotation guide surface, the adapter is operable of revolving relative to the upper shell about the virtual rotation center on the pivot.

4. The adjustment device of claim 3, wherein the upper shell forms an engaging portion at a lower portion of the opening, the pivot comprises an elastic hook passing through the pivot insertion hole and the opening to hook the engaging portion, the hook defines a plurality of notches allowing an end surface of the hook to be elastically contract and expand to be restored, the hook is operable of contracting before hooking the engaging portion, and expanding to be restored in response to hooking the engaging portion.

5. The adjustment device of claim 1, wherein the adapter defines a pair of first guiding holes symmetrically arranged on the first virtual axis about the virtual rotation center, and a pair of second guiding holes symmetrically arranged on the second virtual axis about the virtual rotation center; the upper shell comprises a pair of first guiding portions engaged in the pair of first guiding holes, and a pair of second guiding portions engaged in the pair of second guiding holes, allowing the adapter to revolve only in a fore-and-aft direction and a left-and-right direction.

6. The adjustment device of claim 1, wherein the actuator mechanisms are axisymetrically arranged relative to a virtual center line extending through the virtual rotation center, and the ring gears of the actuator mechanisms are arranged in a 90-degree angle.

7. The adjustment device of claim 1, wherein the clutch assembly comprises a clutch gear meshing with an extremity of the reduction gear set, a pinion gear, and left-handed and right-handed clutch springs, wherein the clutch gear defines a groove in an inner circumference of the clutch gear, the pinion gear comprises a gear portion meshing with the ring gear and a clutch holding surface integrally formed with the gear portion, the left-handed and right-handed clutch springs are fitted about the clutch holding surface and coiled on the clutch holding surface in two opposite directions, a protrusion extends from each of the left-handed and right-handed clutch springs and engages in the groove.

8. The adjustment device of claim 7, wherein the pinion gear defines an annular guiding slot between the gear portion and the clutch holding surface, the clutch holding surface and a portion of the pinion gear defining the guiding slot are located in an inner side of the clutch gear bounded by the inner circumference, a projection extends froth the inner circumference of the pinion gear, and is slidably engaged in the guiding slot to allow the pinion gear to rotate relative to the clutch gear, the left-handed and right-handed clutch springs are located between the clutching holding surface and the inner circumference of the clutch gear.

9. The adjustment device of claim 7, wherein an end of the pinion gear at the clutch holding surface is stepped to form a blocking portion, to prevent the left-handed and right-handed springs from disengaging from the pinion gear.

10. The adjustment device of claim 1, wherein the lower shell forms two arc-shaped guiding parts arranged in a 90-degree angle, the ring gears are operable of revolving relative to the pivot along the guiding parts.

11. The adjustment device of claim 10, wherein each of the ring gears comprises a linking portion on a top end of the ring gear, the linking portion defines a pin hole, the linking portion extends out of the upper shell through the connection hole, a pin extends through the pin hole and is engaged in the adapter.

* * * * *